United States Patent [19]
Minto

[11] Patent Number: 5,357,425
[45] Date of Patent: Oct. 18, 1994

[54] METHOD AND APPARATUS FOR CONTROLLING A REAL TIME SYSTEM

[75] Inventor: Karl D. Minto, Ballston Lake, N.Y.

[73] Assignee: General Electric Company, Schenectady, N.Y.

[21] Appl. No.: 654,695

[22] Filed: Feb. 13, 1991

[51] Int. Cl.$^5$ .............................. G05B 9/03
[52] U.S. Cl. ................... 364/178; 364/184; 364/187; 371/9.1; 371/68.1
[58] Field of Search ............ 364/178, 179, 184–187; 371/68.1, 68.3, 9.1, 36

[56] References Cited

U.S. PATENT DOCUMENTS

| | | | |
|---|---|---|---|
| 4,190,823 | 2/1980 | Leichle | 364/178 |
| 4,415,968 | 11/1993 | Maeda et al. | 364/184 |
| 4,519,025 | 5/1985 | Fayette | 364/178 |
| 4,635,182 | 1/1987 | Hintz | 364/179 |
| 4,644,538 | 2/1987 | Cooper et al. | 364/184 |
| 4,667,284 | 3/1987 | Asami | 371/36 |
| 4,749,986 | 6/1988 | Otani et al. | 364/178 |
| 4,998,194 | 3/1991 | Okamoto et al. | 371/36 |

Primary Examiner—Jerry Smith
Assistant Examiner—Thomas E. Brown
Attorney, Agent, or Firm—Marvin Snyder

[57] ABSTRACT

A method and apparatus are disclosed for inherent, reliable control of real time systems. The technique is based on asynchronously scheduling a plurality of sensor sampling cycles over a suitable sampling interval. The corresponding plurality of sampling signals so obtained are temporally redundant and out of phase with respect to one another. This plurality of sampling signals is processed by a corresponding plurality of controllers. Thereafter, a multiplexor means is used to alternately and asynchronously receive from each controller a subinterval portion of each of the plurality of signals corresponding to each of the plurality of controllers. In this way the sampling interval is responsively partitioned into subintervals wherein each controller of the plurality effectively controls the system for each respective subinterval. Concurrent multiple control of each interval inherently masks and compensates for faults or failures. This inherent feature enhances the robustness, resiliency and reliability of typical control system designs through a relatively easy and inexpensive system upgrade involving the utilization of a temporally redundant sampling scheduling means in conjunction with a multiplexing means.

13 Claims, 6 Drawing Sheets

METHOD AND APPARATUS FOR CONTROLLING A REAL TIME SYSTEM

BACKGROUND OF THE INVENTION

The present invention relates generally to control of real time systems and, more particularly to providing inherently reliable control of real time systems through asynchronous management of temporally redundant signals in a multi-feedback loop configuration.

Redundant control systems are used in various environments where performance and reliability are essential. These include commercial and military applications involving critical systems where performance integrity must be assured. Typical applications might include aerospace flight control systems, power plant monitoring systems, patient monitoring systems and various other computer driven control systems. In order to reliably control a system such as a power plant or a continuous process in an interactive, real time manner, a control system must be resilient to fault or failure occurrence and robust in its ability to minimize or avoid the effects of fault and failure. Modular or configurational redundancy provide a basic technique for providing reliable, resilient, robust control which is tolerant to the occurrence of faults or failures. Various approaches to redundancy management have been exploited in conventional control systems.

A typical control system technique involves the principle of "fault-masking". The approach here is not so much to eliminate faults, but rather to design a control system in such a manner that the integrity of the system is insensitive to the structure and/or content of the information presented to it. This is most often accomplished using redundant, concurrently active multi-control loops. A typical prior art configuration is illustrated in FIG. 1 for the specific case of two feedback control loops. In the event of a fault or failure along the first loop, the second feedback loop will maintain stability for the system. Conversely, should a fault or failure occur along the second loop, the first feedback loop will stabilize the system. In this way, the occurrence of faults or failures, which change the structure or content of information, do not significantly impact the performance of the system. Under nominal (no fault or failure) conditions these independent, redundant, multi-controller feedback loops cooperate to provide active real time monitoring for control of a continuous system. The multi-control loop redundancy of the scheme assures stability in the event of failure.

An often used alternative to this scheme utilizes redundant hardware modules in a parallel multi-modular configuration rather than multi-control loops. The outputs of these redundant modules may be averaged; although "voting" is the more typical mode of modular redundancy management. This prior art scheme is illustrated in FIG. 2 where all modules remain in an active state but not necessarily contributing to the control of the system. "Voting" is used to determine which of the redundant modules will be operating to control the system. Only these modules will be active, those not chosen will remain in stand-by mode. The scheme necessitates detection and isolation of faults or failures followed by reconfiguration when such faults or failures are identified. As long as proper detection and isolation are accomplished reconfiguration based on the availability of redundant stand-by modules can be implemented. Consequently, it is only in steady state following reconfiguration that reliability can be ensured. There remains a small but finite risk that the detection, isolation and reconfiguration process may be faulty or fail altogether. Even if such risk is negligible, under proper operating conditions, a finite amount of time is required for diagnosis and reconfiguration, during which time the system may be driven unstable. Thus, this scheme cannot guarantee transient stability during a fault or failure.

SUMMARY OF THE INVENTION

An object of this invention is to provide a simple, cost effective, control method and apparatus which overcomes those limitations inherent to existing schemes as mentioned above.

Another object is to provide a method and apparatus which guarantee transient stability during faults and failures.

A further object of the invention is to provide predictable performance degradation during fault or failure modes.

Yet another object of this invention is to provide a new method and apparatus for inherently improving reliability in existing control systems with minimal hardware and software expenditure that is capable of general application.

A still further object of the invention is to enhance the nominal performance of almost any typical control system by refining signal resolution.

The present invention is directed to a new and improved method and apparatus for inherently controlling a real time system. An inherently reliable digital control system based on temporally redundant, asynchronous, signal sampling using a plurality of modules in parallel, closed loop configuration is disclosed. A real time system is monitored using a plurality of sensor modules in a parallel configuration. In the most straight forward embodiment of the invention, each sensor is alternately sampled by asynchronous scheduling at the same sampling rate. This provides a plurality of temporally overlapped sensor signals, all collected at the same sampling rate by each of the plurality of sensors. Temporal overlap among the sampling signals results from the fact that the sensors are sampled asynchronously thus the plurality of signals are out of phase with respect to one another. Each of the plurality of sampled sensor signals is transmitted at a predetermined rate to a corresponding controller. Closed loop asynchronous control is completed utilizing a multiplexor means to alternately and asynchronously receive sub-sampling interval portions of the signal from each of the plurality of controllers over each sampling interval. This multiplexing responsively partitions each sampling interval, allowing each controller of the plurality to control the system for a respective sub-interval portion of each sampling interval. Basic processing proceeds at the same sampling rate for each channel, without requiring faster processors to achieve more reliable control.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

DETAILED DESCRIPTION OF THE INVENTION

Figure 1:
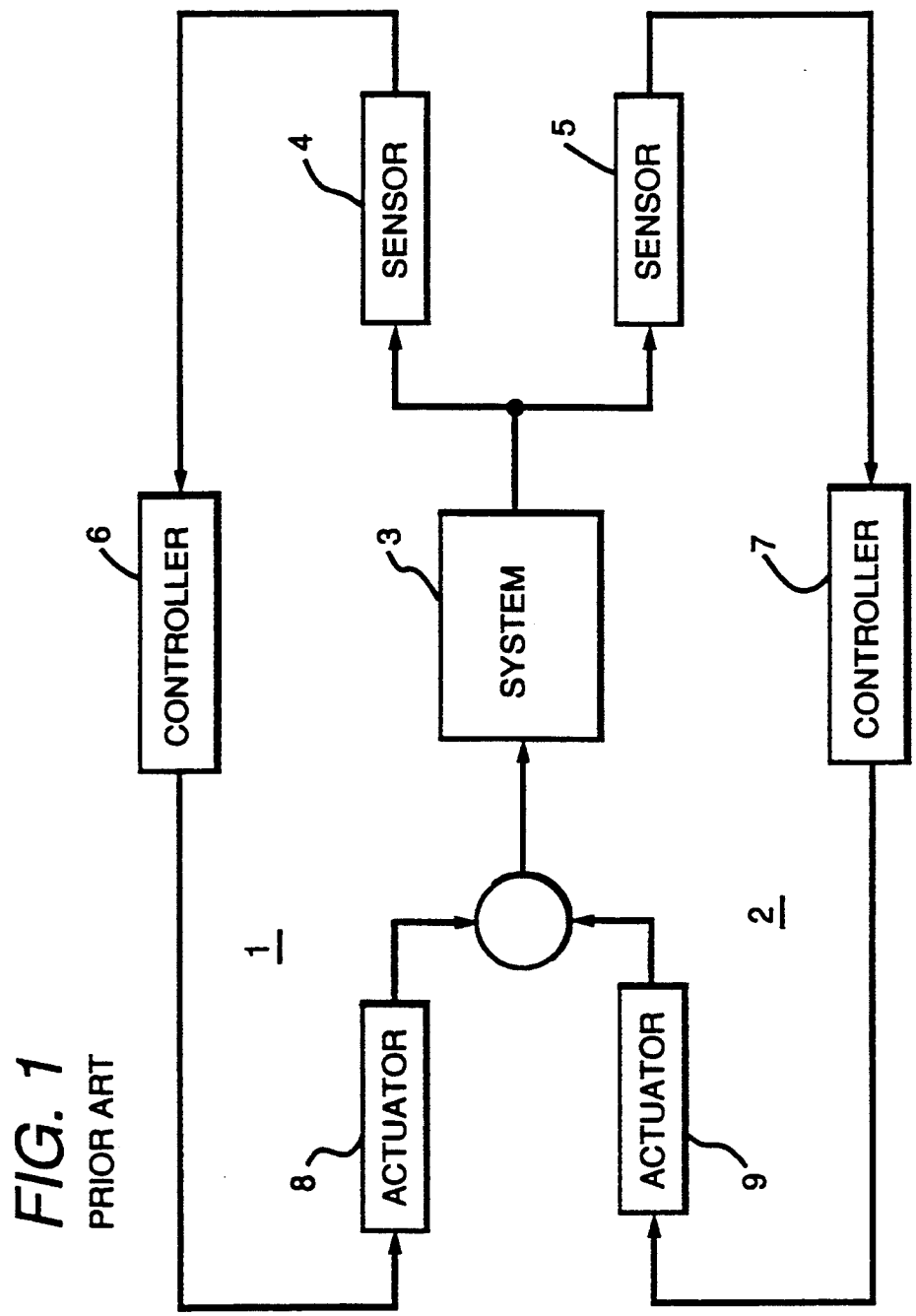
FIG. 1, diagrammatically illustrates a prior art doubly redundant feedback loop control design where two control loops shown a both in active mode.

In FIG. 1, two independent feedback loops 1 and 2 provide conventional means for "fault-masking" by concurrently controlling system 3. Redundant loop 1 comprises a sensor 4, a controller 6, and an actuator 8. In loop 1, sensor 4 samples system 3 for input to controller 6 which in turn signals actuator 8 to drive system 3. Redundant loop 2 comprises a sensor 5, a controller 7, and an actuator 9. In loop 2, sensor 5 samples system 3 for input to controller 7 which in turn signals actuator 9 to drive system 3. Both loops are maintained in active mode, resulting in active-active redundancy.

Figure 2:
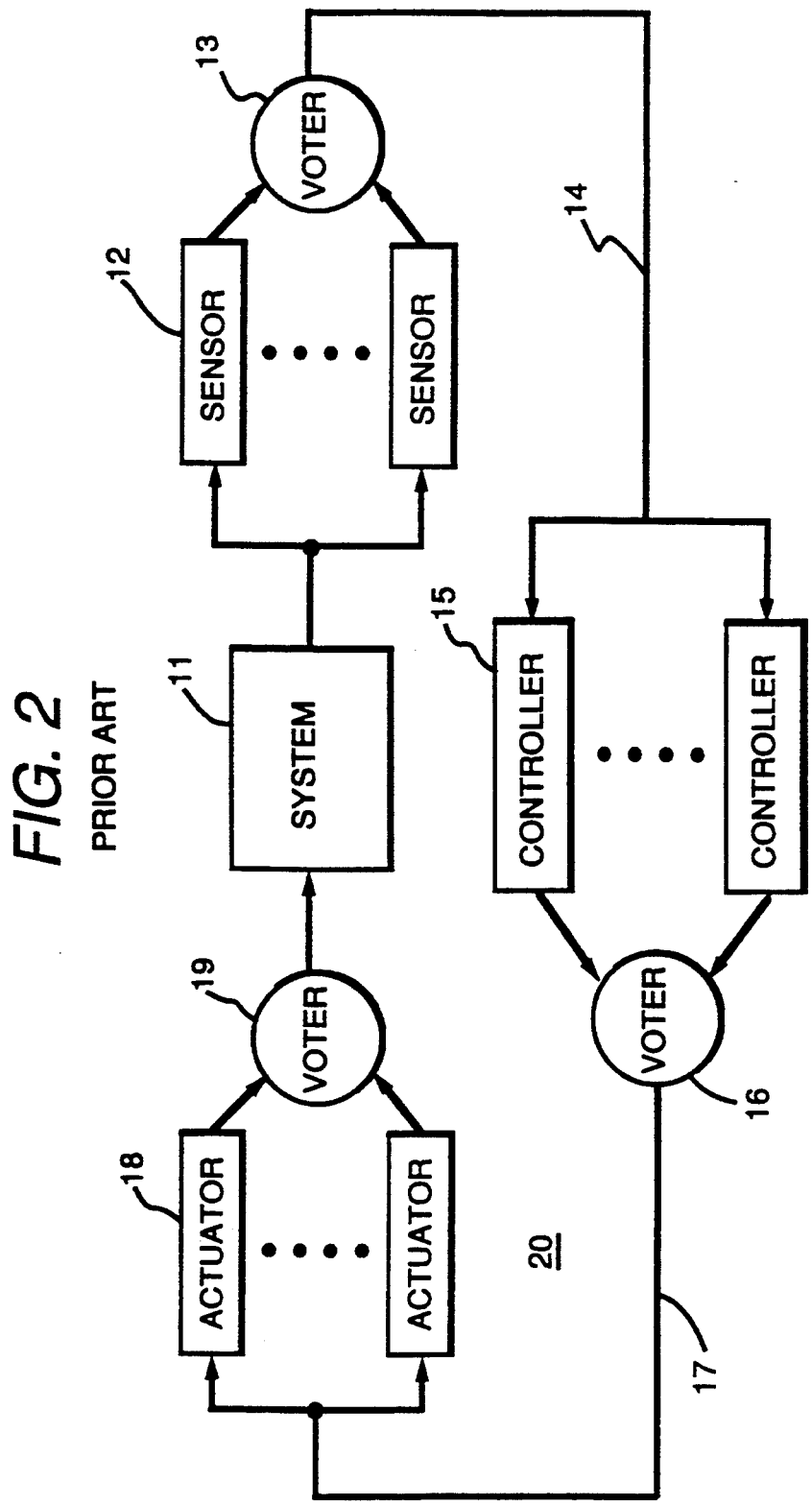
FIG. 2, diagrammatically illustrates a prior art redundant multiple module control design with voting. Not shown but also necessary in this scheme are dedicated modules for detection and isolation of fault or failure as well as reconfiguration.

FIG. 2 illustrates a prior art redundant multi-modular control scheme using "voting" and other dedicated modules not shown in the figure to selectively detect and isolate faults or failures, in order to responsively activate/deactivate these dedicated redundant modules. In this scheme one of an arbitrary plurality of sensors 12 is chosen by voter 13 to sample system 11. A sampling signal 14 is transmitted from sensor 12 to one of an arbitrary plurality of controllers 15 activated by voter 16. Control signal 17 is then transmitted to one of an arbitrary plurality of actuators 18 selected by voter 19 to close the loop 20 and actuate the system 11.

Figure 3:
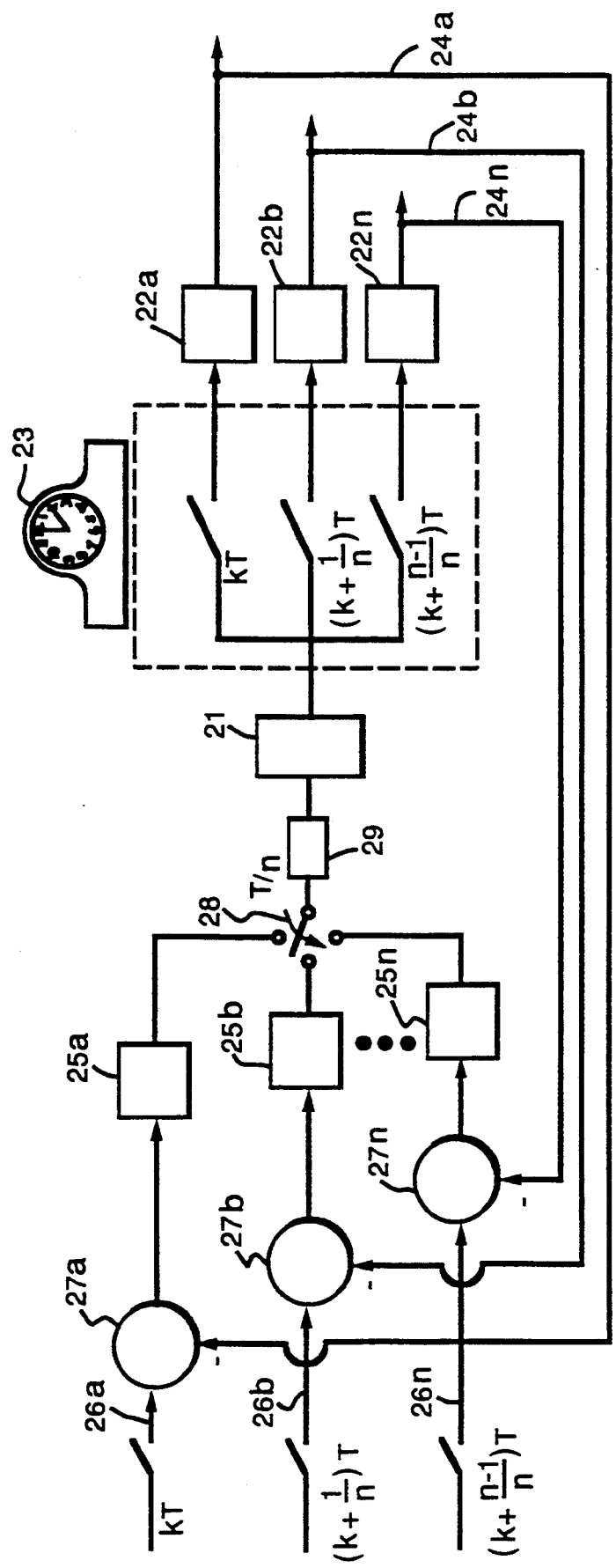
FIG. 3 illustrates the preferred embodiment of the control apparatus of this invention utilizing selective asynchronous sampling of multiple modules in a multiple control loop configuration where all loops are in active mode.

FIG. 3 diagrammatically illustrates an embodiment of this invention wherein a real time system 21 is monitored by a plurality of like sensors, 22a, 22b . . . 22n. The integral multiplicity of sensors is arbitrarily selected and is herein identified by "n". The sensors are of a conventional type which sample the system at a predetermined sampling rate wherein the sampling interval is correspondingly predetermined to be T for all such sensors. A scheduling means, such as a system clock 23, is provided to selectively and asynchronously schedule sampling by each of the plurality of sensors 22a, 22b . . . 22n wherein sampling is characterized by the same sampling interval, T. In the case of evenly distributed asynchronous sampling, each sensor would be scheduled with a T/n phase delay. In this manner, temporally redundant sampling signals are transmitted at the predetermined sampling rate over single channels 24a, 24b . . . 24n respectively to a corresponding plurality of controllers 25a, 25b . . . 25n. Reference signals on separate channels 26a, 26b . . . 26n are typically combined with corresponding sampling signals via summing junctions, representatively identified by numerals 27a, 27b . . . 27n. The error signals resulting from processing of the reference signals are input to controllers 25a 25b . . . 25n. The controller output signals are alternately and asynchronously multiplexed into a single signal stream by multiplexing means, such as multiplexor 28, over each sampling interval, T. In the case of evenly distributed multiplexing, the signals are received from alternate controllers with a T/n phase delay for a multiplicity of "k" sampling intervals. In such case, each kth sampling interval is partitioned into "n" equal subintervals, wherein each controller of the plurality controls the system for an equal duration (T/n) of the sampling interval T. This equally partitioned control signal is then responsively interpreted to actuate the system via representative actuating mechanism 29. In some applications, this may be achieved by redundant actuators.

Figure 4:
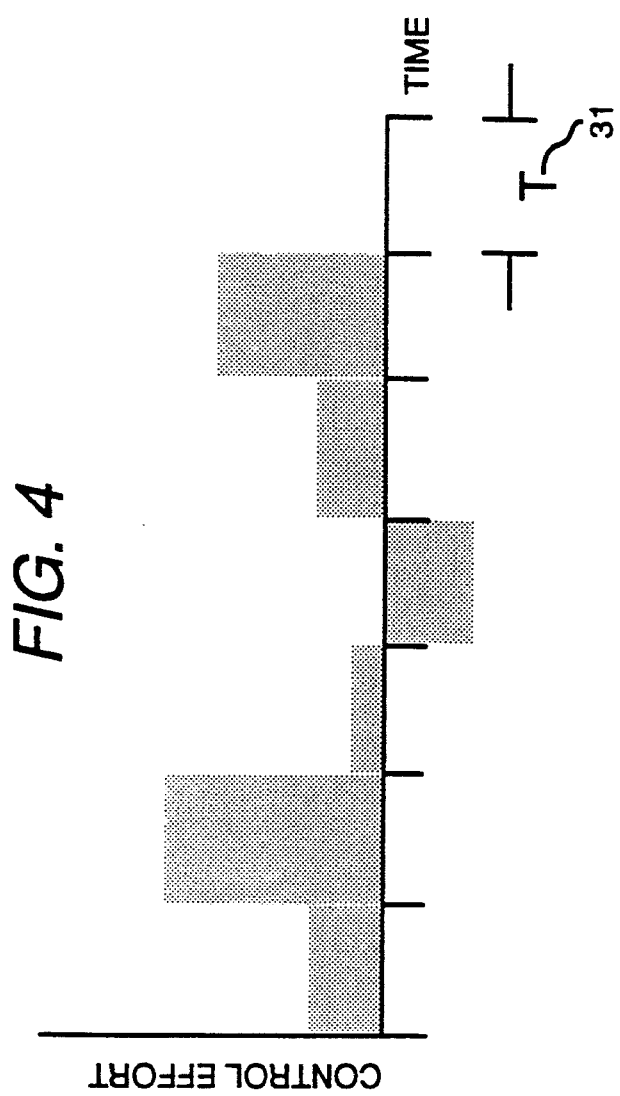
FIG. 4 shows a graphical display of a typical discrete sampling signal taken at a predetermined sampling rate.

In FIG. 4 there is shown a graphical example of a displayed sensor sampling signal. Each sampling signal 24n from sensor 22n shown in FIG. 3 is obtained by sensor sampling in a discrete manner at the predetermined sampling rate corresponding to the sampling interval T identified by numeral 31. With reference to FIG. 3, when the plurality of sensors 22a, 22b . . . 22n are alternately and asynchronously scheduled by the system clock 23, a plurality of sampling signals, 24a, 24b . . . 24n each appearing like that graphically displayed in FIG. 4, are obtained. When viewed together, the plurality of such graphically displayed sampling signals are seen to be out of phase with one another.

Figure 5:
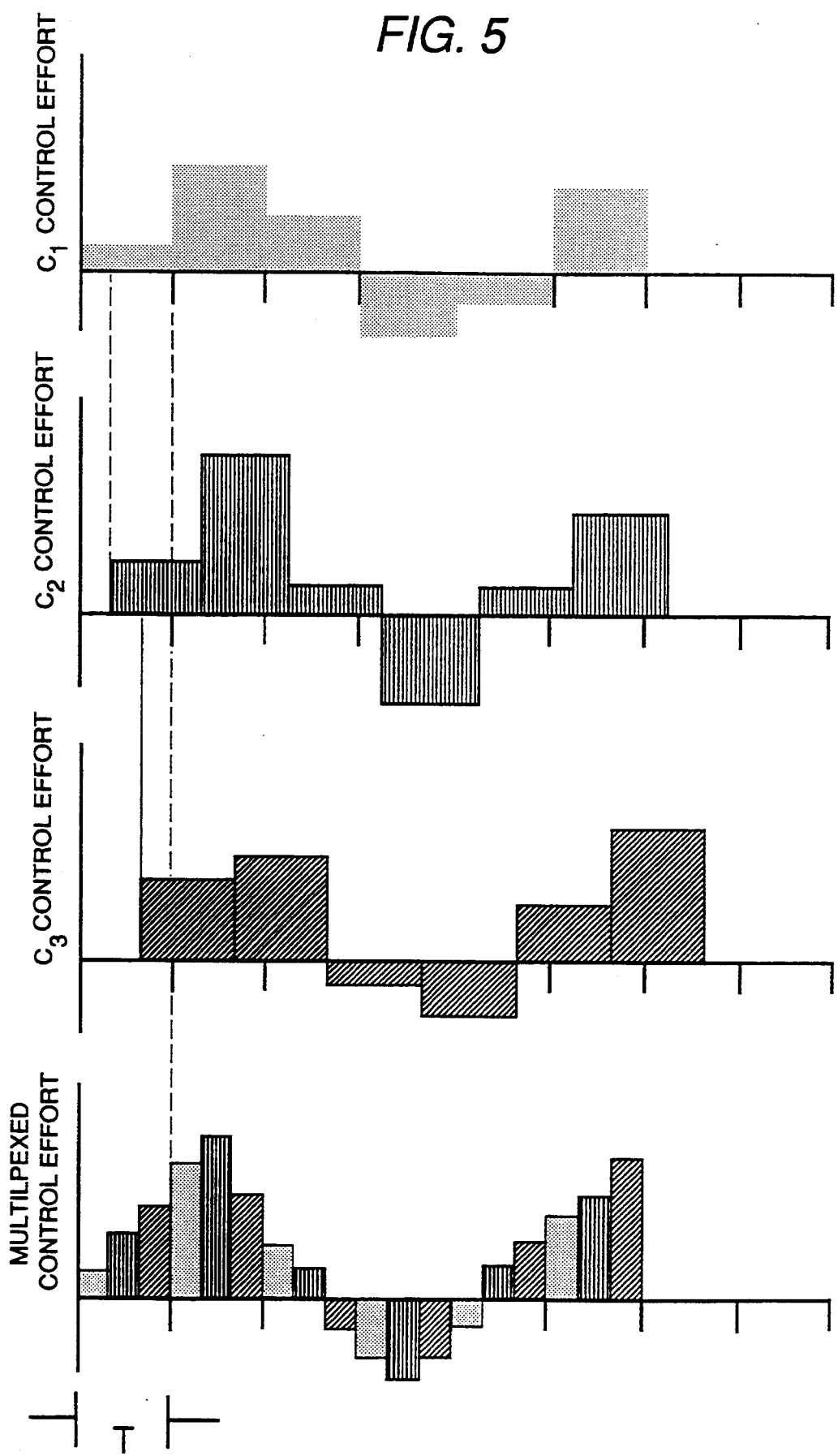
FIG. 5 illustrates a graphical display of multiple, discrete signals, asynchronously sampled to form a composite multiplexed signal.

FIG. 5 indicates graphically the special case of asynchronously scheduling each sensor so that control of each sampling interval T will be distributed equally among the plurality of controllers. Equal distribution involves delaying the sampling of each sensor by T/n. FIG. 5 illustrates a plurality of only n=3 sensors and corresponding controllers. FIG. 5 reveals a concurrent graphic display of asynchronously scheduled sensor signals showing the plurality of n=3 signals to be out of phase with respect to one another as transmitted along channels 24a, 24b . . . 24n at the normal predetermined sampling rate. As is typical, each sampled sensor signal on channel 24n is processed with the corresponding reference signal transmitted at the predetermined sampling rate along channel 26n. It is for this reason that it is important that signals on channels 24n and 26n respectively have the same rate of transmission, i.e. the same period T. Standard summation junctions as identified by numeral 27n in FIG. 3 are sufficient to accommodate this novel control method and apparatus; therefore, no special processors are required. Each resultant sampled error signal is input to a corresponding controller 25n of the plurality of controllers. Each controller output signal is then alternately multiplexed onto a single signal stream using a multiplexor means, identified by numeral 28 in FIG. 3, to selectively receive a subinterval portion of each signal. The multiplexor means 28 systematically and asynchronously samples output signals from each of the plurality of controllers 25n. In this case the multiplexor means 28 receiving rate is predetermined to be responsive to the asynchronous scheduling rate, herein established by system clock 23, to provide a multiplexed signal wherein control of the system is partitioned over sampling interval, T. This is shown for the particular case of n=3 signals in FIG. 5 where multiplexing occurs at T/n equal subintervals. FIG. 5 illustrates that multiplexing effectively partitions each sampling interval T, by the number of redundant sensor-controller modules n; thereby resolving the signal sampling interval by this factor. The information contained in each sampling interval T, has been multiplicatively increased by this factor. Thus, without any regard to improved control, nominal operation of the system has been refined by correspondingly increasing the resolution of a signal sampling interval. Note that signal resolution is determined by an arbitrary design choice of "n".

Figure 6A:
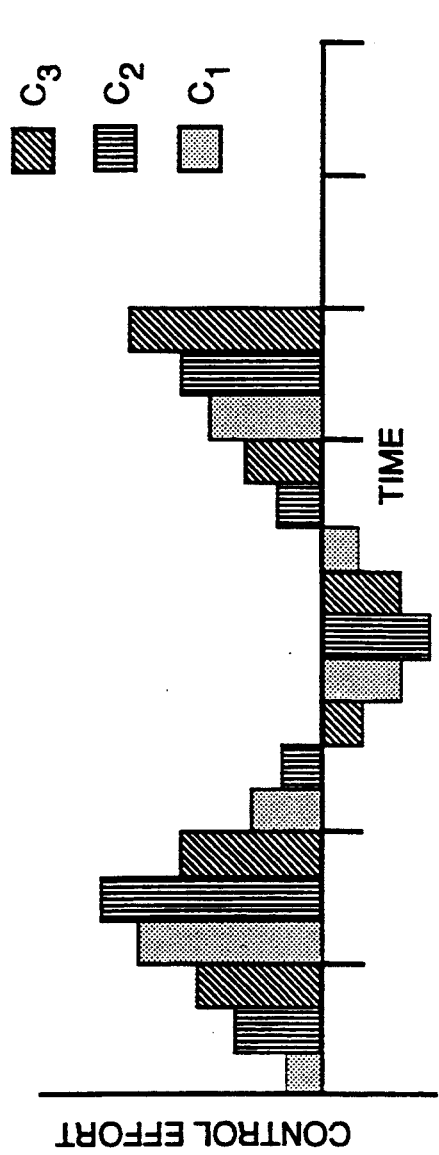
FIG. 6A illustrates a graphical display for n=3 nominally operating controllers showing the resultant multiplexed, i.e. responsively partitioned composite signal.
Figure 6B:
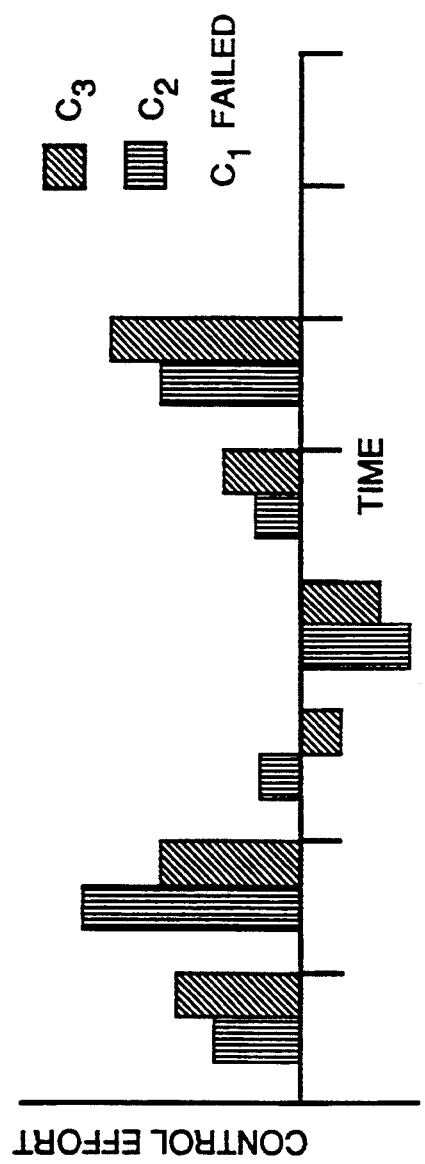
FIG. 6B illustrates a graphical display of the benign effect of fault or failure occurring in one of a plurality of n=3 controllers. Note the multiplexed, i.e. responsively partitioned, composite signal can be substantially interpretted with the loss of information having little or no impact.

The improved control benefit is apparent in comparing FIGS. 6A and 6B. FIG. 6A shows a nominal (no faults or failures) control system response for the special case of a multiplicity of n=3 controllers. Note in FIG. 6B the benign effect of the failure of a single controller, 25a. Only the 25a part of the multiplexed signal is lost on each sampling interval. The remaining valid information effectively masks the effect of the fault or failure of 25a. The collective envelope of information remains discernable and relatively unchanged. It is this relatively unchanged envelope that is interpreted to actuate the system as indicated at numeral 29 in FIG. 3. This control scheme provides a heretofore unattainable level of inherent reliability and system stability. The higher the multiplicity of sensor-controller modules, the less apparent the effect of fault or failure. The number of redundant modules, n, is an arbitrary design choice. This is especially important when the occurrence of multiple faults or failures is probable. For the limited investment of installing an asynchronous system clock and a multiplexor, the performance of any modularly redundant active feedback control multi-loop scheme can be made inherently reliable. In practice the asynchronous sampling operation, realized by modifying both the sensor signal sampling schedule and the multiplexing of controller output signals, is accomplished using existing actuators 29. Thus, the system can be actuated with minimal risk and maximal fault tolerance without imposing additional hardware requirements.

The control method and apparatus disclosed herein may appear to be a hybrid of the prior art configurations shown in FIGS. 1 and 2; however, the "voting" required in the FIG. 2 configuration has been completely eliminated and neither of the multiple loops ever has exclusive control of the system. In the present invention, control is effectively partitioned among a plurality of sensor-controller modules so that each signal actively represents ALL redundant control loops.

In operation, faults or failures need not be detected in order to be managed. Due to asynchronous oversampling by a plurality of sensor-controller modules, control of each sampling interval can be respectively time shared; allowing faults or failures to occupy only a predetermined part of each sampling interval. Fault or failure effects will be factored into each sampling interval; thus, inherently compensated for. This eliminates the need for voting as a means for fault monitoring in a typical parallel configuration. Furthermore, fault detection, isolation and reconfiguration becomes unnecessary. The effect of faults or failures becomes more benign, as their effects are inherently masked and essentially compensated for within each sampling interval. In effect, the faulted or failed portion of the sampling interval corresponding to faulted or failed controllers or sensors becomes effectively averaged over those remaining portions corresponding to remaining valid components. In this way, the method is capable of inherently masking a fault without detecting, isolating or reconfiguring the system.

In addition to providing inherent stability, the finite time otherwise required for diagnosis and switching in and out redundant modules is eliminated, providing greater transient stability. This time savings is just an incidental benefit, the primary benefit of this scheme is that the impact of loss of feedback control is made benign. As such the method inherently improves fault tolerance and performance reliability in any control system design.

The sampling interval over which each controller operates is the same; but the degree of asynchronous oversampling subdivides the interval integrally corresponding to the plurality of controllers monitoring that sampling interval. Thus, although the sampling rate is unchanged, the resolution of the interval has been improved. In the event of failure, the effects of lost information is distributed over the remaining subintervals. The impact of fault or failure occurrence on closed loop performance is not only minimized but made predictable.

In addition, even nominal system performance, i.e. when all control modules and loops are functioning properly, is improved by refining the resolution of the sampling interval without unduly constraining the sampling rate. The sampling rate is still limited by physical constraints such as computer execution time, but its resolution is not. This is a useful and important benefit in that signal resolution is improved beyond physical limitations that were heretofore treated as absolute constraints. The methodology disclosed takes full advantage of intersampling interval information which is ignored in conventional signal processing. This effect is independent of control law or algorithm design. It offers more signal precision for the same given sampling interval.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

I claim:

1. A method for inherently controlling a real time system comprising the steps of:

temporally sampling the system with a plurality of redundant sensors at predetermined sampling intervals;

alternately and asynchronously scheduling the sampling of the plurality of redundant sensors to provide a corresponding plurality of asynchronous, temporally redundant sampling signals;

transmitting the asynchronous plurality of temporally redundant sampling signals to each of a corresponding plurality of controllers; and alternately and asynchronously multiplexing a subinterval portion from each of the plurality of signals corresponding to each of the plurality of controllers to responsively partition each sampling interval into a corresponding plurality of subintervals, wherein each controller of the plurality controls the system for each respective subinterval of each sampling interval.

2. The method of claim 1 wherein the plurality of sensors sample the process at the same sampling rate.

3. The method of claim 1 wherein the sampling signals are transmitted at a predetermined sampling rate.

4. The method of claim 1 wherein the sampling intervals are equal.

5. The method of claim 1 wherein asynchronous scheduling and selective multiplexing occur at the same rate.

6. The method of claim 1 wherein the transmitting step is interrupted by reference signal processing proceeding at a predetermined rate.

7. The method of claim 6 wherein the rate of sensor signal sampling corresponds to the predetermined rate of reference signal processing.

8. The method of claim 1 wherein responsive partitioning of each sampling interval refines sampling signal resolution.

9. An apparatus for inherently controlling a real time system comprising:

a plurality of redundant controllers;

a plurality of redundant sensors which alternately and asynchronously sample the system in an interval manner;

asynchronous sample scheduling means for selective and alternate sampling of the system by each of the plurality of sensors;

means for transmitting sampling signals from each of the plurality of sensors to each of the plurality of controllers;

multiplexing means for selectively receiving respective subinterval portions of each signal alternately from each of the plurality of controllers in order to responsively partition each sampling interval, wherein each controller of the plurality controls the system for a respective subinterval of the sampling interval; and means to responsively actuate the system.

10. Apparatus of claim 9 wherein asynchronous sample scheduling means is a system clock.

11. Apparatus of claim 9 wherein multiplexing means is a multiplexor.

12. Apparatus of claim 9 wherein each of the plurality of sensors respectively corresponds to each of the plurality of controllers.

13. Apparatus of claim 9 wherein the means for transmitting sampling signals includes means for reference signal processing.

* * * * *